United States Patent Office 3,383,385
Patented May 14, 1968

3,383,385
PROCESS FOR THE PREPARATION OF STEROID DERIVATIVES OF THE PREGNANE SERIES
Robert Bucourt, Clichy-sous-Bois, Germain Costerousse, Montrouge, and Gerard Nomine and Andre Pierdet, Noisy-le-Sec, and Jean Tessier, Paris, France, assignors to Roussel-USLAF, Paris, France, a corporation of France
No Drawing. Filed July 30, 1964, Ser. No. 386,375
Claims priority, application France, Aug. 7, 1963, 944,032, 944,033; Jan. 16, 1964, 960,549
15 Claims. (Cl. 260—239.57)

ABSTRACT OF THE DISCLOSURE

The present invention relates to a novel process for the preparation of steroid derivatives of the pregnane series which comprises reacting a 17-ketone steroid with a carbanion of a phosphorane ethylidene or a carb-lower-alkoxymethyl-phosphonate, subjecting the resultant $\Delta^{17(20)}$-pregnene to a hydroxylating oxidation and recovering a steroid derivative of the pregnane series. The invention also involves novel intermediates in the synthesis.

THE PRIOR ART

In the semisynthesis of the cortisonic hormones from natural products, the degradation of a side chain of a steroid having 24 or 27 carbon atoms presents considerable problems.

In the total synthesis of steroids of the pregnane series, the same sort of problem in an inverse manner occurs. In these preparations, the tetracyclic skeleton is synthesized first, resulting, in general, in a cyclopentano-polyhydrophenanthrene with a hydroxyl or a ketone in the 17 position [see for example, Velluz et al., C.R. Acad. of Sciences, 250, p. 1084, 1293 and 1510 (1960)] and then the problem of edification of a side chain with two carbon atoms on the D ring in the 17 position and of introducing a hydroxyl in the same position has to be met.

The previous means, used until now, to solve this problem were either by a 17 cyanohydrin derivative or by a 17 ethynyl derivative.

The first of these processes is slow and tedious because it requires, following the formation of the cyanohydrin, a dehydration of same to give a 17-cyano 16,17-dehydro derivative, a Grignard reaction on the nitrile group in order to obtain the corresponding methyl ketone, then the introduction of the 17-hydroxyl group which includes three steps: formation of the 16,17-epoxide, transformation of same into bromohydrin and reduction of the bromine. Altogether, six steps are necessary, which may be represented as follows:

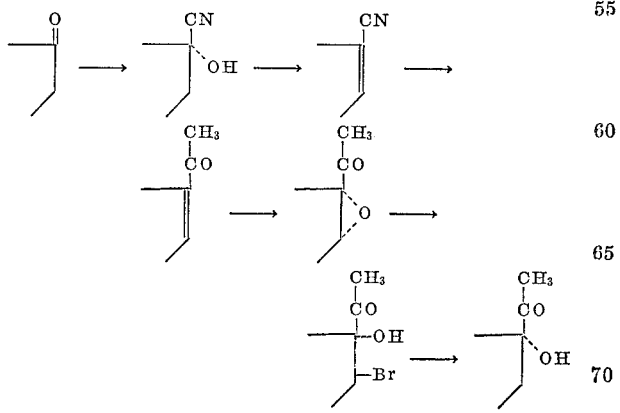

The process having recourse to the ethynylation step is not much more rapid. The 17β-hydroxy 17α-ethynyl steroid is first reduced into the corresponding vinyl derivative, then the hydroxyl is transformed into the hydrobromic ether under conditions which simultaneously effect an allyl rearrangement, the effect of which is to cause the bromine to shift to the 21 position with rearrangement of the 20–21 double bond into the 17–20 position. By acetoxylation and hydroxylating oxidation, a 17α-hydroxy 20-oxo 21-acetoxyl derivative is then obtained. This process, which comprises five steps, of which a partial flow diagram is given below:

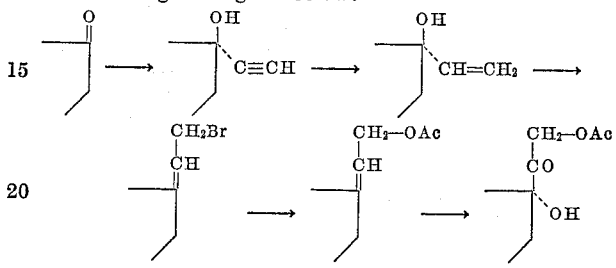

presents, however, a substantial disadvantage, namely the difficulties in the bromination step. This reaction is sometimes difficult to effect with good yields and, in the case of specific steroids, it may fail altogether.

Furthermore, it is known that certain authors (see in particular Sondheimer et al. J.A.C.S., 79, p. 5 029, 1957) have condensed various phosphorus ylides with ketone steroids, but the resulting products, as shown, for instance, in the case of the 3β-hydroxy 17-methylene $\Delta^5$-androstene, do not represent any practical interest for the solution of the present problem.

Other authors have completely failed in their attempts to react a carbethoxymethylphosphonate with a 17 ketone steroid (see in particular Bose et al. Tetrahedron Letters No. 15, p. 959–963, 1963).

OBJECTS OF THE INVENTION

An object of the present invention is the development of a process for the production of pregnane derivatives of the formula

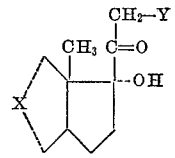

wherein Y is selected from the group consisting of hydrogen and —OR' where R' is selected from the group consisting of hydrogen and the acyl radical of an organic carboxylic acid having from 1 to 18 carbon atoms and X represents the A, B and C rings of a steroid molecule, which comprises the steps of reacting a 17 ketone steroid of the formula

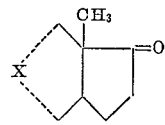

wherein X has the above-assigned meaning with a carbanion of a phosphorus compound selected from the group consisting of phosphorane ethylidenes and carb-lower-alkoxymethylphosphonates, subjecting the resultant $\Delta^{17(20)}$-pregnene of the formula

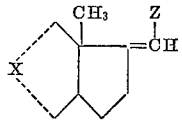

wherein X has the above-assigned meaning and Z is selected from the group consisting of —CH$_3$ and —COOR″ where R″ represents lower alkyl, to a hydroxylating oxidation and recovering said pregnane derivatives.

A further object of the present invention is the development of a process for the production of a Δ$^{17(20)}$-pregnene of the formula

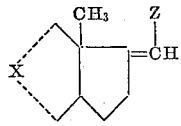

wherein Z is selected from the group consisting of —CH$_3$ and —COOR″ where R″ represents lower alkyl and X represents the A, B and C rings of a steroid molecule which comprises the steps of reacting a 17-ketone steroid of the formula

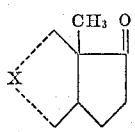

wherein X has the above-assigned meaning with a carbanion of a phosphorus compound selected from the group consisting of phosphorane ethylidenes and carb-lower-alkoxymethylphosphonates, and recovering said Δ$^{17(20)}$-pregnene.

Another object of the present invention is the development of a process for the production of a 20-oxopregnane of the formula

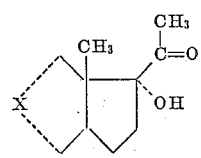

wherein X represents the A, B and C rings of a steroid molecule which comprises the steps of reacting a 17-ketone steroid of the formula

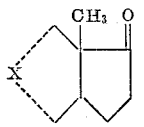

wherein X has the above-assigned meaning with a carbanion of triphenylphosphine ethylidene in an organic solvent selected from the group consisting of dioxane and dimethylsulfoxide, subjecting the resultant Δ$^{17(20)}$-pregnene of the formula

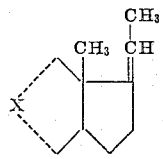

wherein X has the above-assigned meaning to the action of an osmium tetraoxide based oxidizing agent in a tertiary alcoholic media, adding a peroxide of a tertiary amine oxide and recovering said 20-oxo-pregnane.

A yet further object of the invention is the development of a process for the production of a 20-oxo-pregnane of the formula

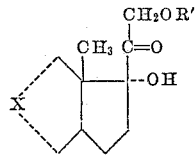

wherein R′ is selected from the group consisting of hydrogen and the acyl radical of an organic carboxylic acid having from 1 to 18 carbon atoms and X represents the A, B and C rings of a steroid molecule which comprises the steps of reacting a 17-ketone steroid of the formula

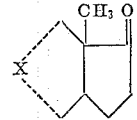

wherein X has the above-assigned meaning with a carbanion of a di-lower-alkyl carb-lower-alkoxymethylphosphonate, subjecting the resultant Δ$^{17(20)}$-pregnene of the formula

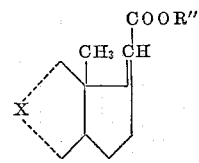

wherein X has the above-assigned meaning and R″ represents lower alkyl, to the action of a mixed metal hydride in an organic solvent, esterifying the resultant Δ$^{17(20)}$-21-hydroxy-pregnene of the formula

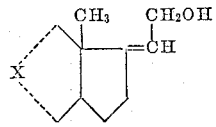

wherein X has the above-assigned meaning by the action of an esterifying derivative of an organic carboxylic acid having from 1 to 18 carbon atoms, subjecting the resultant ester of the formula

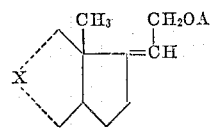

wherein X has the above-assigned meaning and Ac represents the acyl radical of an organic carboxylic acid having from 1 to 18 carbon atoms, to the action of an osmium tetraoxide based oxidizing agent in a tertiary alcoholic media, adding a peroxide of a tertiary amine oxide and recovering said 20-oxo-pregnane.

A still further object of the invention is the obtention of the novel intermediates:

19-nor-9β,10α-Δ$^{4,17(20)}$-pregnadiene-3-one
19-nor-9β,10αΔ$^4$-pregnene-17α-ol-3,20-dione
9α-bromo-10β-n-propyl-Δ$^4$-estrene-11β-ol-3,17-dione
9α-bromo-10β-n-propyl-Δ$^4$-estrene-3,11,17-trione
10β-n-propyl-Δ$^4$-estrene-3,11,17-trione
3-ethoxy-10β-n-propyl-Δ$^{3,5}$-estradiene-11,17-dione
3-pyrrolidyl-10β-n-propyl-Δ$^{3,5}$-estradiene-11,17-dione
The ethyl ester of 3-ethoxy-10β-n-propyl-19-nor-Δ$^{3,5,17(20)}$-pregnatriene-11-one-21-oic acid.
The ethyl ester of 3-pyrrolidyl-10β-n-propyl-19-nor-Δ$^{3,5,17(20)}$-pregnatriene-11-one-21-oic acid.
The ethyl ester of 10β-n-propyl-19-nor-Δ$^{4,17(20)}$-pregnadiene-3,11-dione-21-oic acid.
The ethyl ester of 3-ethylenedioxy-10β-n-propyl-19-nor-Δ$^{5,17(20)}$-pregnadiene-11-one-21-oic acid
3-ethylenedioxy-10β-n-propyl-19-nor-Δ$^{5,17(20)}$-pregnadiene-11β,21-diol
3-ethylenedioxy-21-acetoxy-10β-n-propyl-19-nor-Δ$^{5,17(20)}$-pregnadiene-11β-ol
3-ethylenedioxy-21-acetoxy-10β-n-propyl-19-nor-Δ$^5$-pregnene-11β,17α-diol-20-one
The 10,11 lactone of 3-ethylenedioxy-19-nor-Δ$^{5,17(20)}$-pregnadiene-11β-ol-10β-carboxylic acid
The 10,11 lactone of 3-ethylenedioxy-19-nor-Δ$^5$-pregnene-11β,17α-diol-20-one-10β-carboxylic acid The 10,11 lactone of 3-ethylenedioxy-21-diiodo-19-nor-Δ⁵-pregnene-11β,17α-diol-20-one-10β-carboxylic acid The 10,11 lactone of 3-ethylenedioxy-21-acetoxy-19-nor-Δ⁵-pregnene-11β,17α-diol-20-one-10β-carboxylic acid 17α-acetoxy-19-nor-9β,10α-Δ⁴-pregnene-3,20-dione 21-acetoxy-10β-n-propyl-19-nor-Δ⁴-pregnene-11β,17α-diol-3,20-dione (10β-n-propyl-19-nor-hydrocortisone acetate)

10β-n-propyl-19-nor-Δ⁴-pregnene-11β,17α,21-triol-3,20-dione (10β-n-propyl-19-nor-hydrocortisone)

The 10,11 lactone of 19-nor-Δ⁴-pregnene-11β,17α,21-triol-3,20-dione-10β-carboxylic acid and its 21 esters.

These and other objects of the invention will become more apparent as the description thereof proceeds.

DESCRIPTION OF THE INVENTION

It has been found that it is possible to prepare 17α-hydroxy-20-oxo steroids having a lateral chain containing two carbon atoms starting from the corresponding 17-ketonic derivatives by the condensation of a carbanion of a phosphorus derivative selected from the group of phosphorane ethylidenes and of carb-lower-alkoxymethylphosphonates with a 17-ketonic steroid, and transformation of the product obtained according to well known methods, into a 17α-hydroxyl derivative of desired structure.

In a general manner, the process of the invention may be represented by the following flow diagram:

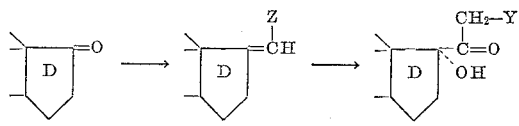

wherein Z represents —CH₃ or —COOR″, R″=lower alkyl and wherein Y represents hydrogen or OR′, R′=H or the acyl radical of an organic carboxylic acid having from 1 to 18 carbon atoms.

The condensation of the carbanions of the phosphorane ethylidenes with the 17-ketonic steroids results in 17-ethylidene derivatives, easily transformable into 17α-hydroxy 20-oxo steroids, according to the following flow diagram:

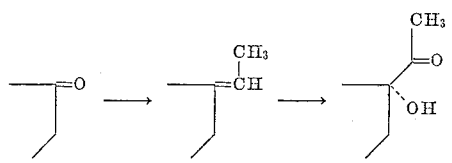

The products thus obtained may be hydroxylated or acetoxylated in the 21 position according to well known processes (see, for example, French Patent No. 1,222,408 and United States Patent No. 3,062,848).

The new process, therefore, allows the rapid obtention of 17α-hydroxy-20-ketone steroid derivatives having an lateral chain containing two carbon atoms starting from 17-ketone derivatives, and it presents the advantage of producing them with very satisfactory yields.

According to this variant of the invention a carbanion or ylide of a phosphorane ethylidene is reacted with a 17-ketone steroid whose reactive ketone group, if any, in the A ring is protected in the form of a ketal or an enamine. The preferable phosphorane ethylidene is a triarylphosphine ethylidene, preferably triphenylphosphine ethylidene, the probable carbanion formula of which is $$(C_6H_5)_3\equiv P^+ —\overline{C}H—CH_3$$

The reaction is conducted in a solvent preferably selected from the group consisting of dioxane and dimethylsulfoxide. The corresponding 17-ethylidene steroid derivative obtained by the reaction is readily transformed by hydroxylating oxidation into the desired 17α-hydroxy-20-oxo steroid.

The hydroxylating oxidation of the 17-ethylidene steroid is easily obtained by the action of an osmium tetraoxide based oxidizing agent in a media of a tertiary alcohol, such as tertiary butyl alcohol or tertiary amyl alcohol, and thereafter operating in the presence of a peroxide of tertiary amine oxide, as for instance that of trimethylamine oxide, triethylamine oxide, picoline oxide, etc.

According to the other variant of the present invention, the lateral chain may be introduced likewise in the 17 position on steroid derivatives with the aid of other compounds of phosphorus than the phosphoranes, namely the carbanion derivatives of the di-lower-alkyl carb-lower-alkoxymethylphosphonates and in particular the carbanion of diethyl carbethoxymethylphosphonate. The reaction is conducted in an organic solvent, preferably in dimethoxyethane.

In particular a carbanion of a di-lower-alkyl carb-lower-alkoxymethylphosphonate of the formula

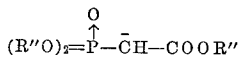

wherein R″ represents lower alkyl, especially the carbanion of diethyl carbethoxymethylphosphonate (R″=C₂H₅), is reacted with a 17-ketone steroid, a 17,20-dehydro or 17-carb-lower-alkoxymethylene steroid is obtained. It is transformed, after protection of the reducible functions, by reduction into a 21-hydroxy steroid. This 21-hydroxyethylidene steroid is subjected, after preliminary protection of its alcohol function in the 21 position in the form of an ester, to a hydroxylating oxidation. The corresponding 17α-hydroxy-20-oxo steroid is obtained and transformed by conventional methods, into any other desired derivative.

For anyone skilled in the art, it will be evident that the process of the invention may be applied to the preparation of other 17α-hydroxy 20-oxo steroids than those of the examples. For instance, cortisone, 6α-methyl-17α-acetoxyprogesterone, 3 - cyclopentyloxy - 17α - acetoxy-Δ³,⁵-pregnadiene-20-one, etc., starting from the corresponding 17-ketonic derivatives.

In a general manner, of course, in the case where the starting steroid represents, in addition to the ketone group in the 17 position, other ketone groups capable of reacting under the conditions as described above, it is necessary to provisionally protect the same by customary means such as by transforming them into ketals, enol ethers or enamines.

The following examples enable a better comprehension of the invention. It is to be understood however that other expedients known to those skilled in the art may be employed without departing from the invention.

Example I.—Preparation of 17α-acetoxy-19-nor-9β, 10α-Δ⁴-pregnene-3,20-dione starting from 3-pyrrolidyl-9β, 10α-Δ³,⁵-estradiene-17-one STEP A.—19-NOR-9β,10α-Δ⁴,¹⁷⁽²⁰⁾-PREGNADIENE-2-ONE 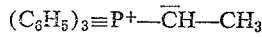

(a) Preparation of the reagent.—4.8 g. of a suspension of 55% sodium hydride in mineral oil were added to 40 cc. of anhydrous dimethylsulfoxide and the mixture was agitated for 45 minutes under a nitrogen atmosphere at a temperature of 80–85° C.

Then the mixture was cooled to room temperature, 39 g. of triphenylethylphosphonium bromide placed in suspension in 80 cc. of anhydrous dimethylsulfoxide were added and the reaction mixture was agitated for ¼ hour.

(b) Preparation of 3-pyrrolidyl-9β,10α-Δ³,⁵-estradiene-17-one.—A solution of 218 mg. of chromic acid anhydride in 0.2 cc. of sulfuric acid and 12 cc. of water were added to a solution of 0.6 g. of 9β,10α-Δ⁴-estrene-17β-ol-3-one in 120 cc. of acetone. The mixture was agitated for a period of 4 hours at room temperature. Then water was added thereto to cause a precipitate and the aqueous suspension was extracted with methylene chloride. The organic extracts, washed with an aqueous solution of sodium bicarbonate, were dried over sodium sulfate and then distilled. The raw diketone was isolated with a practically quantitative yield.

By trituration in 1.8 cc. of isopropyl ether, 540 mg. of 9β,10α-Δ⁴-estrene-3,17-dione were obtained. The melting point was 135° C.

2 cc. of pyrrolidine were added to 1.005 g. of 9β,10α-Δ⁴-estrene-3,17-dione and the mixture was heated to 85–90° C. for 10 minutes. 30 cc. of methanol were added to the hot solution. The 3-pyrrolidyl-9β,10α-Δ³,⁵-estradiene-17-one crystallized from the media. By simple vacuum-filtering the product was separated. 1.07 g. of 3-pyrrolidyl-9β,10α-Δ³,⁵-estradiene-17-one were obtained having a melting point of 160° C.

(c) Condensation.—3.1 g. of 3-pyrrolidyl-9β,10α-Δ³,⁵-estradiene-17-one were introduced in the suspension of the yield prepared as above in (a) and the mixture was agitated for a period of 23 hours under a nitrogen atmosphere at a temperature of 50–55° C. The mixture was then cooled and taken up in a mixture of water and benzene. The benzene phase was separated and washed with water, then extracted with N hydrochloric acid. The acid solution was allowed to stand at rest for 1 hour, then made alkaline with N sodium hydroxide solution. The precipitate obtained was extracted with methylene chloride and the organic phase was washed, dried and evaporated to dryness.

The product obtained was subjected to chromatography through magnesium silicate and eluated with methylene chloride containing 0.5% of acetone. The product was recrystallized from isopropyl ether, and 1.344 g. of 19-nor-9β,10α-Δ⁴,¹⁷⁽²⁰⁾-pregnadiene-3-one were recovered having a melting point of 90° C.

This product is not described in the literature.

STEP B.—19-NOR-9β,10α-Δ⁴-PREGNENE-17α-OL-3,20-DIONE 1.344 g. of 19-nor-9β,10α-Δ⁴,¹⁷⁽²⁰⁾-pregnadiene-3-one were introduced into 80 cc. of tertiary butanol, 2 cc. of a solution of 0.17 g. of osmium tetraoxide in 6 cc. of pyridine were added, and the mixture was agitated for a period of 40 minutes at room temperature. 1.44 g. of the peroxide of triethylamine oxide were added to the reaction mixture in small portions over a period of 40 minutes. Then the mixture was agitated for ¼ hour and poured into water containing sodium sulfite. The aqueous mixture was extracted with methylene chloride. The extracts were washed with water, dried and evaporated to dryness.

The product was purified by recrystallization first from acetone, then from ethanol, and 0.660 g. of 19-nor-9β,10α-Δ⁴-pregnene-17α-ol-3,20-dione were obtained having a melting point of 255° C.

This product is not described in the literature.

STEP C.—17α-ACETOXY-19-NOR-9β,10α-Δ⁴-PREGNENE-3,20-DIONE 0.465 g. of 19-nor-9β,10α-Δ⁴-pregnene-17α-ol-3,20-dione were dissolved in 2.3 cc. of acetic acid and 0.23 cc. of acetic acid anhydride, containing 1% of sulfuric acid, were added thereto. The solution was allowed to stand at 20° C. for a period of 16 hours, then 0.25 cc. of methanol were added. Finally the solution was poured into water and extracted with methylene chloride.

The crude reaction product was taken up in 30 cc. of ethyl acetate. By this method, the starting product, which had not been acetylated, was separated in insoluble form. The product in solution was purified by subjecting it to chromatography through magnesium silicate. Elution with methylene chloride containing 5% of acetone separated 17α-acetoxy-19-nor-9β,10α-Δ⁴-pregnene-3,20-dione, which, purified by recrystallization from isopropyl ether or from ethanol, had a melting point of 188° C.

The infrared spectra in carbon disulfide shows bands at 1740 cm.⁻¹ and 1250 cm.⁻¹, attributed to the 17-acetate, bands at 1715 cm.⁻¹ and 1350 cm.⁻¹ (20-ceto), and at 1675 cm.⁻¹ and 882 cm.⁻¹ (3 ceto Δ⁴).

This product possesses a progestative activity. It is not described in the literature.

Example II.—Preparation of the 10,11 lactone of 3-ethylenedioxy-19-nor-Δ⁵-pregnene-11β,17α-diol-20-one-10β-carboxylic acid STEP A.—THE 10,11 LACTONE OF 3-ETHYLENEDIOXY-19-NOR-Δ⁵,¹⁷⁽²⁰⁾-PREGNADIENE-11β-OL-10β-CARBOXYLIC ACID For a period of 40 minutes, the following mixture was agitated at room temperature:

Dioxane _____ cc__ 68
Triphenylethylphosphonium bromide _____ g__ 10.1
Solution of 2.2 N butyl-lithium in hexane _____ cc__ 11.4

About 15 cc. of the solvent were distilled over a period of 30 minutes, so that the temperature of the vapor attained 100–101° C. Then 1.002 g. of the 10–11 lactone of 3-ethylenedioxy-19-nor-Δ⁵-androstene-11β-ol-17-one-10β-carboxylic acid were added.

The solution was heated to reflux over a period of 5 hours under a nitrogen atmosphere, then poured over ice. The aqueous mixture was extracted with ether. The extracts were washed with water, dried and evaporated to dryness under vacuum. The residue was subject to chromatography through magnesium silicate. After washing the column with methylene chloride, the 10–11 lactone of 3-ethylenedioxy-19-nor-Δ⁵,¹⁷⁽²⁰⁾-pregnadiene-11β-ol-10β-carboxylic acid was eluted with methylene chloride containing 40% of ether. After the purification, the product had a melting point of 205° C., the yield amounted to 60 to 70%.

The product occurred in form of colorless crystals, insoluble in water, dilute aqueous acids and alkalis, and soluble in alcohol, ether, acetone, benzene and chloroform.

Analysis.—C₂₃H₃₀O₄; molecular weight=370.47. Calculated: C, 74.56%; H, 8.16%. Found: C, 74.2%; H, 8.2%.

This product is not described in the literature.

The starting material, the 10,11-lactone of 3-ethylenedioxy-19-nor-Δ⁵-androstene-11β-ol-17-one-10β-carboxylic acid was prepared according to the following procedure. 3.2 g. of chromic acid were placed in suspension in 32 cc. of pyridine. The suspension was cooled to the neighborhood of 0° C., agitated for a period of ¼ hour, then a solution of 3.2 g. of the 10,11 lactone of 3-ethylenedioxy-Δ⁵-estrene-11β,17β-diol-10β-carboxylic acid dissolved in 32 cc. of redistilled pyridine was added slowly thereto. The 10–11 lactone of 3-ethylenedioxy-Δ⁵-estrene-11β,17β-diol-10β-carboxylic acid can be prepared as described in copending, commonly assigned United States patent application Ser. No. 232,609, filed Oct. 23, 1962, now U.S. Patent 3,150,127.

The reaction mixture was agitated at room temperature for a period of 16 hours, then 3.2 cc. of methanol was added and the agitation was continued for a further period of ¼ hour. The suspension was taken up with methylene chloride. The organic phase was separated, washed with water, dried and subjected to chromatography through magnesium silicate. The column was eluted with methylene chloride containing 3% pyridine and after evaporation of the solvent 3.092 g. of a residue were obtained. The residue obtained was triturated by a mixture of methyl alcohol and isopropyl ether (1:4). The precipitate was vacuum filtered, washed and dried. The 10–11 lactone of 3-ethylenedioxy-19-nor-Δ⁵-androstene-11β-ol-17-one-10β-carboxylic acid was obtained having a melting point of 236° C. and a specific rotation $[\alpha]_D^{20}$=+85°±1° (c.=0.4% in methanol).

Analysis.—C₂₁H₂₆O₅; molecular weight=358.42. Calculated: C, 70.36%; H, 7.31%. Found: C, 70.0%; H, 7.2%.

STEP B.—THE 10–11 LACTONE OF 3-ETHYLENEDIOXY-19-NOR-Δ⁵-PREGNENE-11β,17α-DIOL-20-ONE-10β-CARBOXYLIC ACID 1.214 g. of the 10–11 lactone of 3-ethylenedioxy-19-nor-Δ⁵,¹⁷⁽²⁰⁾-pregnadiene-11β-ol-10β-carboxylic acid were dissolved in 80 cc. of tertiary butanol and 2 cc. of the following solution were added:

Osmium tetraoxide _____ mg__ 152
Pyridine _____ cc__ 6

The solution was agitated for a period of 40 minutes at a temperature of about 35° C., then, over a period of 1 hour, 1.32 g. of the peroxide of triethylamine oxide were introduced in small portions. The agitation was maintained for ¼ hour, and then the solution was poured into a liter of water containing 5 g. of sodium sulfite. Next, the aqueous mixture was extracted with ether, washed, dried and evaporated to dryness.

The residue was crystallized from ethyl acetate and 0.718 g. of the 10–11 lactone of 3-ethylenedioxy-19-nor-$\Delta^5$-pregnene-11$\beta$,17$\alpha$-diol-20-one-10$\beta$-carboxylic acid was obtained having a melting point of 272° C.

This compound, which is novel, is an intermediary product of the synthesis of the 10–11 lactone of 19-nor-$\Delta^4$-pregnene-11$\beta$,17$\alpha$,21-triol-3,20-dione-10$\beta$ carboxylic acid. This synthesis is described hereinafter.

Example III.—Preparation of the 10–11 lactone of 19-nor - $\Delta^4$ - pregnene - 11$\beta$,17$\alpha$,21 - triol - 3,20 - dione-10$\beta$-carboxylic acid STEP A.—THE 10–11 LACTONE OF 3-ETHYLENEDIOXY-21 - DIIODO - 19 - NOR - $\Delta^5$ - PREGNENE - 11$\beta$,17$\alpha$ - DIOL-20-ONE-10$\beta$-CARBOXYLIC ACID 0.783 g. of the 10–11 lactone of 3-ethylenedioxy-19-nor-$\Delta^5$-pregnene-11$\beta$,17$\alpha$-diol-20-one-10$\beta$-carboxylic acid were dissolved in 4 cc. of methanol and 4 cc. of a 10% solution of calcium chloride in methanol. Next, 0.8 g. of slaked lime were added. Then the mixture was agitated under a nitrogen atmosphere and slowly 1 g. of iodine in solution in 10 cc. of methanol containing 10% of calcium chloride was introduced. The reaction mixture was agitated for a period of 15 minutes at room temperature, then poured into 80 cc. of water containing 2 cc. of acetic acid.

1.011 g. of the 10–11 lactone of 3-ethylenedioxy-21-diiodo - 19 - nor - $\Delta^5$ - pregnene - 11$\beta$,17$\alpha$ - diol - 20 - one-10$\beta$-carboxylic acid were recovered, which was used as such for the following step.

This compound is not described in the literature.

STEP B.—THE 10–11 LACTONE OF 3-ETHYLENEDIOXY-21 - ACETOXY - 19 - NOR - $\Delta^5$ - PREGNENE - 11$\beta$,17$\alpha$-DIOL-20-ONE-10$\beta$-CARBOXYLIC ACID The following mixture was heated to reflux:

Acetone _____ cc__ 7
Dimethylformamide _____ cc__ 1.75
Acetic acid _____ cc__ 0.45
Potassium acetate _____ g__ 1.1

Then, 1.011 g. of the 10–11 lactone of 3-ethylenedioxy-21-diiodo-19-nor-$\Delta^5$ - pregnene - 11$\beta$,17$\alpha$-diol-20-one-10$\beta$-carboxylic acid were introduced into the refluxing mixture and refluxing was maintained for 1 hour. Next, the mixture was poured into water. The aqueous mixture was extracted with methylene chloride. The extracts were washed with water, with a saturated solution of sodium bicarbonate, then dried and evaporated to dryness under vacuum. After crystallization from ethyl acetate, 0.499 g. of the 10–11 lactone of 3-ethylenedioxy-21-acetoxy-19-nor-$\Delta^5$-pregnene-11$\beta$,17$\alpha$-diol-20-one-10$\beta$-carboxylic acid were obtained, which after recrystallization from ethyl acetate and from acetone had a melting point of 272° C.

The product occurred in the form of colorless crystals, insoluble in water, dilute aqueous acids and alkalis, and soluble in alcohol, ether, acetone, benzene and chloroform.

Analysis.—$C_{25}H_{32}O_8$; molecular weight=460.51. Calculated: C, 65.20%; H, 7.00%. Found: C, 65.3%; H, 7.1%.

This product is not described in the literature.

STEP C.—THE 10–11 LACTONE OF 19-NOR-$\Delta^4$-PREGNENE-11$\beta$,17$\alpha$,21 - TRIOL - 3,20 - DIONE - 10$\beta$ - CARBOXYLIC ACID 225 mg. of the 10–11 lactone of 3-ethylenedioxy-21-acetoxy-19-nor-$\Delta^5$-pregnene-11$\beta$,17$\alpha$-diol-20-one-10$\beta$-carboxylic acid were dissolved in 15 cc. of methanol. 9 cc. of concentrated hydrochloric acid and 6 cc. of water were added to this mixture, which was then agitated for 1 hour under a nitrogen atmosphere. Water was next added and the aqueous mixture was extracted with methylene chloride. The extracts were washed with water and evaporated to dryness under vacuum. 5 cc. of acetone were added to the residue and the solution was iced. The precipitate was washed and dried.

63 mg. of the 10–11 lactone of 19-nor-$\Delta^4$-pregnene-11$\beta$,17$\alpha$,21-triol-3,20-dione-10$\beta$-carboxylic acid were obtained. After recrystallization from ethanol, the melting point was 312° C. and the specific rotation $[\alpha]_D^{20}=+186°$ (c.=0.5% in dimethylformamide).

The product occurred in the form of colorless crystals, insoluble in water, dilute aqueous acids and alkalis, acetone and benzene, very slightly soluble in alcohol and soluble in chloroform.

Analysis.—$C_{21}H_{26}O_6$; molecular weight =374.42. Calculated: C, 67.36%; H, 7.00%. Found: C, 67.5%; H, 7.2%.

The compound is not described in the literature.

The 21 alcohol group of this compound is readily esterified with organic hydrocarbon acids having from 1 to 18 carbon atoms according to conventional procedures.

The 10–11 lactone of 19-nor-$\Delta^4$-pregnene-11$\beta$,17$\alpha$,21-triol-3,20-dione-10$\beta$-carboxylic acid and its 21 acyloxy derivatives corresponding to the formula

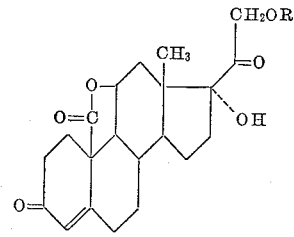

wherein R is selected from the group consisting of hydrogen and the acyl radical of an organic hydrocarbon carboxylic acid having from 1 to 18 carbon atoms.

These new compounds of the above formula are endowed with useful therapeutic properties. They intervene particularly in a favorable manner in the mechanism for the elimination of water and of electrolytes.

Example IV.—Preparation of the ethyl ester of 3-ethoxy-10$\beta$-n-propyl-19-nor-$\Delta^{3,5,17(20)}$ - pregnatriene-11-one-21-oic acid and its transformation into the ethyl ether of 10$\beta$-n-propyl-19-nor-$\Delta^{4,17(20)}$-pregnadiene-3,11-dione-21-oic acid (a) Preparation of the reagent.—480 mg. of sodium hydride in a 50% dispersion in vaseline oil were placed in suspension in 23.1 cc. of dimethoxyethane. Then 2.1 cc. of diethyl carbethoxymethylphosphonate were added slowly while agitating under a nitrogen atmosphere and the agitation was maintained for 1 hour. A limpid colorless solution was obtained.

(b) Condensation.—Slowly and in small amounts 600 mg. of 3-ethoxy-10$\beta$-n-propyl-$\Delta^{3,5}$-estradiene-11,17-dione were introduced into the solution of the reagent prepared as above. The reaction mixture was agitated for a period of 1 hour and 30 minutes at room temperature under a nitrogen atmosphere. The reaction was completed by heating the mixture to reflux for 1 hour, then cooling same and adding water thereto.

The aqueous mixture was extracted with ether. The extracts were washed with water until the wash waters were neutral, dried and evaporated to dryness under vacuum. 1.055 g. of the ethyl ester of 3-ethoxy-10$\beta$-n- propyl-19-nor-$\Delta^{3,5,17(20)}$-pregnatriene-11-one-21-oic acid were obtained and used as such for the following step of the preparation.

This compound is not described in the literature.

THE ETHYL ESTER OF 10β-n-PROPYL-19-NOR-$\Delta^{4,17(20)}$-PREGNADIENE-3,11-DIONE-21-OIC ACID 1.055 g. of the ethyl ester of 3-ethoxy-10β-n-propyl-19-nor-$\Delta^{3,5,17(20)}$-pregnatriene-11-one-21-oic acid, obtained in the preceding step, were dissolved in 12 cc. of ethanol while heating to 55° C. and while agitating under a nitrogen atmosphere. 1.2 cc. of N hydrochloric acid were added. The mixture was kept under agitation at 55° C. for 5 minutes, then cooled and finally water was added. The aqueous mixture was extracted with methylene chloride. The extracts were washed with water until the wash waters were neutral, then dried and evaporated to dryness under vacuum. 1.060 g. of product were thus obtained.

The product obtained was subject to chromatography through magnesium silicate and eluted with methylene chloride containing 1% of acetone. The solution obtained was evaporated to dryness under vacuum. The evaporated fraction was recrystallized from anhydrous isopropyl ether at reflux. 460 mg. of the ethyl ester of 10β-n-propyl-19-nor-$\Delta^{4,17(20)}$-pregnadiene-3,11-dione-21-oic acid were obtained having a melting point of 164–165° C. and a specific rotation $[\alpha]_D^{20} = +91.7°$ (c.=0.5% in methanol).

The product occurred in the form of colorless prisms, insoluble in water, dilute aqueous acids and alkalis, slightly soluble in isopropyl ether, soluble in alcohols and ether, and very soluble in acetone, benzene and chloroform.

Analysis.—$C_{25}H_{34}O_4$; molecular weight=398.52. Calculated: C, 75.43%; H, 8.59%. Found: C, 75.5%; H, 8.8%.

The I.R. spectra is in accord with the proposed structure.

This compound is not described in the literature.

The ethyl ester of 10β-n-propyl-19-nor-$\Delta^{4,17(20)}$-pregnadiene-3,11-dione-21-oic acid is readily transformed into 10β-n-propyl-19-nor-hydrocortisone as indicated in Example VIII which follows.

The starting product, 3-ethoxy-10β-n-propyl-$\Delta^{3,5}$-estradiene-11,17-dione can be obtained in the following manner:

Example V

STEP A.—9α-BROMO-10β-n-PROPYL-$\Delta^4$-ESTRENE-11β-OL-3,17-DIONE 525 mg. of 10β-n-propyl-$\Delta^{4,9(11)}$-estradiene-3,17-dione (prepared as described in United States Patent No. 3,141,025, issued July 14, 1964) were introduced into 15 cc. of acetone and in the absence of light, 390 mg. of N-bromosuccinimide were added.. The mixture was brought to a temperature of 10° C. and slowly, while agitating under a nitrogen atmosphere, 1.5 cc. of an aqueous perchloric acid solution were added, the solution being prepared as follows:

| | Cc. |
|---|---|
| 65% perchloric acid | 1.7 |
| Distilled water | 6 |

The agitation was maintained for a further 15 minutes at a temperature of about 10° C., then slowly water was added to the solution. The aqueous mixture was extracted with methylene chloride and the extracts were washed with water until the washed waters were neutral. The extract was dried and evaporated to dryness under vacuum. 690 mg. of 9α-bromo-10β-n-propyl-$\Delta^4$-estrene-11β-ol-3,17-dione were obtained which were used as such for the following step of the preparation.

This product was insoluble in water and dilute aqueous acids, and soluble in most of the common organic solvents.

This compound is not described in the literature.

STEP B.—9α-BROMO-10β-n-PROPYL-$\Delta^4$-ESTRENE-3,11,17-TRIONE 690 mg. of 9α-bromo-10β-n-propyl-$\Delta^4$-estrene-11β-ol-3,17-dione were dissolved in 3.2 cc. of anhydrous acetone and 4.3 cc. of acetic acid. While working under a nitrogen atmosphere at a temperature of about 10° C., 0.85 cc. of a sulfochromic acid solution were added, this solution being prepared as follows:

| | | |
|---|---|---|
| Chromic acid anhydride | g | 2.67 |
| Water | cc | 3 |
| Sulfuric acid | cc | 2.3 |
| Water | cc | 4 |

The reaction mixture was agitated over a period of ½ hour at a temperature of about 10° C., then 0.4 cc. of methanol and 10 cc. of water were added. The aqueous mixture was extracted with methylene chloride. The extracts were washed with water until the wash waters were neutral, dried and evaporated to dryness under vacuum.

620 mg. of 9α-bromo-10β-n-propyl-$\Delta^4$-strene-3,11,17-trione were obtained, which product was utilized for the next step in the preparation.

The product was insoluble in water, dilute aqueous acids and alkalis and soluble in most of the common organic solvents.

This compound is not described in the literature.

STEP C.—10β-n-PROPYL-$\Delta^4$-ESTRENE-3,11,17-TRIONE 620 mg. of 9α-bromo-10β-n-propyl-$\Delta^4$-esrene-3,11,17-trione were dissolved in 12 cc. of 90% acetic acid and the mixture was agitated under a nitrogen atmosphere at a temperature of about 10° C. 280 mg. of zinc powder were slowly added and the agitation was continued for 10 minutes. Then the mixture was vacuum filtered and was washed with acetic acid and acetone.

The filtrate and wash liquors were combined and concentrated under vacuum. The residue was taken up with water and extracted with methylene chloride. The extracts were washed with water until the wash waters were neutral, dried and concentrated to dryness under vacuum. 500 mg. of a product were obtained. The product was subjected to chromatography through magnesium silicate. Elution with methylene chloride containing 4% of acetone followed by an evaporation to dryness under vacuum of the eluate furnished a resin which was recrystallized successively from a mixture of methanol and isopropyl ether (1:10) and from a mixture of acetone and isopropyl ether (2:3). 100 mg. of 10β-n-propyl-$\Delta^4$-estrene-3,11,17-trione were obtained having a melting point of 179–180° C., and a specific rotation $[\alpha]_D^{20} = +230°$ C. (c.=0.5% in methanol).

This compound occurred in the form of colorless prisms, insoluble in water, dilute aqueous acids and alkalis, and soluble in alcohols, ether, acetone, benzene and chloroform.

Analysis.—$C_{21}H_{28}O_3$; molecular weight=328.43. Calculated: C, 76.79%; H, 8.59%. Found: C, 77.0%; H, 8.6%.

U.V. spectra: in ethanol: Max. 240 mμ $E_{1cm}^{1\%}$=435

The I.R. spectra is in accord with the proposed structure.

This compound is not described in the literature.

STEP D.—3-ETHOXY-10β-n-PROPYL-$\Delta^{3,5}$-ESTRADIENE-11,17-DIONE 1.2 g. of 10β-n-propyl-$\Delta^4$-estrene-3,11,17-trione were dissolved in 6 cc. of ethanol and 1.2 cc. of anhydrous ethyl orthoformiate while heating to about 70° C. and while agitating under a nitrogen atmosphere. 1.2 cc. of an alcoholic solution containing 0.022 g. of paratoluene sulfonic acid for 50 cc. of ethanol, were added to the mixture, and after 10 minutes, 2.4 cc. of ethyl orthoformiate were further introduced in two amounts.

The agitation was continued for 20 minutes, then 0.5 cc. of triethylamine were added and the mixture was cooled to room temperature. After addition of water to the reaction mixture, it was extracted with methylene chloride. The extracts were washed with water, dried and evaporated to dryness under vacuum.

1.44 g. of resin was recovered, which was subjected to chromatography through magnesium silicate and eluted with methylene chloride containing 1% acetone. The eluate was evaporated to dryness under vacuum. A product was obtained which, when recrystallized from refluxing isopropyl ether, yielded 807 mg. of 3-ethoxy-10β-n-propyl-$\Delta^{3,5}$-estradiene-11, 17-dione having a melting point of 134–135° C.

The product occurred in the form of colorless prisms, insoluble in water and dilute aqueous alkalis, and soluble in most of the common organic solvents.

I.R. spectra: Qualitatively in accord with the proposed structure, it revealed in particular the absence of a ketone function in the 3 position and a double bond in the 4 position.

This compound is not described in the literature.

Example VI.—Preparation of the ethyl ester of 3-pyrrolidyl - 10β - n - propyl-19-nor-$\Delta^{3,5,17(20)}$-pregnatriene-11-one-21-oic acid and its transformation into the ethyl ester of 10β-n-propyl-19-nor-$\Delta^{4,17(20)}$-pregnadiene-3,11-dione-21-oic acid 82 mg. of 3-pyrrolidyl-10β-n-propyl-$\Delta^{3,5}$-estradiene-11, 17-dione were introduced into the carbanionic reagent prepared from 72 mg. of sodium hydride, 35 cc. of dimethoxyethane and 0.35 cc. of diethyl carbethoxymethylphosphonate according to the method of operation described in Example IV, Steps A and B. The mixture was agitated for 1½ hours under a nitrogen atmosphere at room temperature and completed by heating to reflux for 1 hour.

The mixture was then cooled to room temperature and water was added. The aqueous mixture was extracted with ether. The extracts were washed with water until the wash waters were neutral, dried and evaporated to dryness under vacuum. 210 mg. of the product were obtained.

The product obtained after recrystallization from ether, yielded 56 mg. of the ethyl ester of 3-pyrrolidyl-10β-n-propyl - 19-nor-$\Delta^{3,5,17(20)}$-pregnatriene-11-one-21-oic acid having a melting point of 200° C.

The product occurred in the form of colorless needles, insoluble in water and slightly soluble in the common organic solvents.

The I.R. spectra is in accord with the proposed structure, the circular dichroism (in dioxane) at 315 mμ is of $\Delta\epsilon = +1.92$.

This compound is not described in the literature.

THE ETHYL ESTER OF 10β-n-PROPYL-19-NOR-$\Delta^{4,17(20)}$-PREGNADIENE-3,11-DIONE-21-OIC ACID 45 mg. of the ethyl ester of 3-pyrrolidyl-10β-n-propyl-19-nor-$\Delta^{3,5,17(20)}$-pregnatriene-11-one-21-oic acid were dissolved in 0.045 cc. of acetic acid, then 0.45 cc. of water were added and the mixture was allowed to stand for 1 hour at room temperature. Thereafter, drop by drop, a 2 N sodium hydroxide solution was added until an alkaline pH was obtained, then the mixture was stirred vigorously and iced for one hour.

The precipitate was vacuum filtered, washed with water until the wash waters were neutral and dried under vacuum. 36 mg. of product were obtained, which, when recrystallized from isopropyl ether heated to reflux, yielded 30 mg. of the ethyl ester of 10β-n-propyl-19-nor-$\Delta^{4,17(20)}$ - pregnadiene - 3,11 - dione-21-oic acid having a melting point of 164–165° C. and a specific rotation $[\alpha]_D^{20} = +91.7°$ (c.=0.5% in methanol).

This compound is identical to that described in Example IV.

The ethyl ester of 10β-n-propyl-19-nor-$\Delta^{4,17(20)}$-pregnadiene-3,11-dione-21-oic acid may be transformed into 10β-n-propyl-19-nor-hydrocortisone, a product presenting an interesting physiological activity similar to that of hydrocortisone by the process of Example VIII.

The starting product, 3-pyrrolidyl-10β-n-propyl-$\Delta^{3,5}$-estradiene-11,17-dione, may be obtained as follows.

Example VII 100 mg. of 10β - n - propyl - $\Delta^4$-estrene-3,11,17-trione, which may be obtained as described in Example V, Step C, were introduced into 2 cc. of pyrrolidine and heated to reflux for a period of 15 minutes while agitating under a nitrogen atmosphere. The excess pyrrolidine was removed by a stream of nitrogen and while heating the reaction mixture, it was brought to a volume of about 0.3 cc., then 0.5 cc. of methanol were added. The mixture was cooled for half an hour. The precipitate was vacuum filtered, washed with methanol and dried under vacuum. 95 mg. of 3-pyrrolidyl-10β-n-propyl-$\Delta^{3,5}$-estradiene-11,17-dione were obtained having a melting point of 130–150° C.

The product occurred in the form of needles, insoluble in water and slightly soluble in the common organic solvents.

The I.R. spectra was in accord with the proposed structure.

This compound is not described in the literature.

Example VIII.—Preparation of 10β-n-propyl-19-nor-hydrocortisone

STEP A.—THE ETHYL ESTER OF 3-ETHYLENEDIOXY-10β - n - PROPYL - 19 - NOR - $\Delta^{5,17(20)}$ - PREGNADIENE-11-ONE-21-OIC ACID 400 mg. of the ethyl ester of 10β-n-propyl-19-nor-$\Delta^{4,17(20)}$ - pregnadiene - 3,11-dione-21-oic acid (prepared according to Example IV or VI) were introduced into 32 cc. of anhydrous benzene. 20 mg. of para-toluene sulfonic acid and 0.8 cc. of ethylene glycol were added thereto. The mixture was heated to reflux over a period of 5 hours while agitating under nitrogen atmosphere, then cooled to about 10° C. and 500 mg. of sodium bicarbonate were added at one time.

The mixture was agitated for 5 minutes, water was added in order to obtain an alkaline pH, then the mixture was decanted and extracted in ether. The extracts and benzene fraction combined were washed with water until the wash waters were neutral, dried and evaporated to dryness under vacuum. 460 mg. of product were thus obtained.

A recrystallization of the product obtained from isopropyl ether at reflux yielded 250 mg. of the ethyl ester of 3 - ethylenedioxy-10β-n-propyl-19-nor-$\Delta^{5,17(20)}$-pregnadiene-11-one-21-oic acid having a melting point of 180° C.

The product occurred in the form of colorless prismatic needles, insoluble in water and dilute aqueous alkalis and soluble in most of the common organic solvents.

Glycol content=14.3 (theory: 14.02%).

The I.R. spectra was in accord with the proposed structure. It showed the absence of a ketone in 3 position and of a double bond in the 4 position.

This compound is not described in the literature.

STEP B.—3-ETHYLENEDIOXY-10β-n-PROPYL-19-NOR-$\Delta^{5,17(20)}$-PREGNADIENE-11β,21-DIOL At room temperature, 510 mg. of the ethyl ester of 3-ethylenedioxy-10β-n-propyl-19-nor - $\Delta^{5,17(20)}$ - pregnadiene-11-one-21-oic acid were dissolved in 51 cc. of anhydrous ether. 510 mg. of aluminum lithium hydride were added and the mixture was agitated for the period of half an hour under a nitrogen atmosphere. Next, another 340 mg. of aluminum lithium hydride were added and the reaction mixture was heated to reflux for a period of one hour.

The mixture was cooled to 0° C., water was added slowly, then 100 cc. of methylene chloride were added and thereafter the mixture was agitated for a few minutes at room temperature. The organic phase was decanted, and the aluminia deposit was taken up several times by a mixture of water and methylene chloride, filtered, rinsed with methylene chloride. The various wash liquors were combined and decanted. The organic phases were combined, washed with water until the wash waters were neutral, dried and evaporated to dryness under vacuum. 474 mg. of product were obtained.

The product obtained was triturated with isopropyl ether at reflux, and 370 mg. of 3-ethylenedioxy-10β-n-propyl-19-nor-Δ5,17(20)-pregnadiene-11β,21-diol were obtained having a melting point of 200° C.

The compound occurred in the form of colorless needles, insoluble in water and dilute aqueous alkalis, slightly soluble in alcohols and ether, and soluble in acetone, benzene and chloroform.

The I.R. spectra was in accord with the proposed structure. It revealed in particular the absence of the ketone in the 11 position and of the conjugated ester.

This compound is not described in the literature.

STEP C.—3-ETHYLENEDIOXY-21-ACETOXY-10β-n-PROPYL-19-NOR-Δ5,17(20)-PREGNADIENE-11β-OL 500 mg. of 3-ethylenedioxy-10β-n-propyl-19-nor-Δ5,17(20)-pregnadiene-11β,21-diol were introduced into 6 cc. of pyridine and 3 cc. of acetic acid anhydride and the mixture was agitated for a period of 15 hours at room temperature under a nitrogen atmosphere. Thereafter, the mixture was slowly poured under agitation into a saturated solution of sodium bicarbonate in the presence of ether. The aqueous phase was decanted and extracted with ether.

The combined organic phases were washed with water until the wash waters were neutral, dried and evaporated to dryness under vacuum. 610 mg. of product were obtained.

The product obtained was subjected to chromatography through magnesium silicate and eluted with methylene chloride containing 1% of acetone. The fraction obtained was evaporated to dryness under vacuum and 540 mg. of 3-ethylenedioxy - 21 - acetoxy-10β-n-propyl - 19-nor-Δ5,17(20)-pregnadiene-11β-ol were recovered.

The product is insoluble in water and soluble in most of the common organic solvents.

The I.R. spectra was in accord with the proposed structure.

This compound is not described in the literature.

STEP D.—3-ETHYLENEDIOXY-21-ACETOXY-10β-n-PROPYL-19-NOR-Δ5-PREGNENE-11β,17α-DIOL-20-ONE 540 mg. of 3-ethylenedioxy-2-acetoxy-10β-n-propyl-19-nor-Δ5,17(20)-pregnadiene-11β-ol were dissolved in 25 cc. of tertiary butanol while agitating under a nitrogen atmosphere. Slowly, 0.575 cc. of the following solution were added:

Osmium tetraoxide _____ mg__ 50
Pyridine _____ cc__ 2 while agitating over a period of 45 minutes at room temperature.

Thereafter, over the period of one hour, 0.5 g. of the peroxide of triethylamine oxide containing 21% of active oxygen were introduced in small amounts into the solution. Then the solution was further agitated for 20 minutes and next a solution of 250 mg. of sodium sulfite in 25 cc. of water was added.

After 5 minutes the reaction mixture was poured into water and extracted with ether. The extracts were washed with water until the wash waters were neutral, then dried and evaporated to dryness under vacuum. 620 mg. of product were obtained.

The product obtained was subjected to chromatography through magnesium silicate and eluted with methylene chloride containing 4% acetone. The solution obtained was evaporated to dryness under vacuum. 434 mg. of 3-ethylenedioxy-21-acetoxy-10β-n-propyl-19-nor - Δ5 - pregnene-11β,17α-diol-20-one were obtained having a melting point of 215-220° C.

This product, which was utilized as such for the following step of the example, occurred in the form of colorless needles, insoluble in water, dilute aqueous alkalis and ether, slightly soluble in alcohols, acetone and chloroform, and soluble in benzene.

The I.R. spectra was in accord with the proposed structure.

This compound is not described in the literature.

STEP E.—21 - ACETOXY-10β-n-PROPYL-19-NOR-Δ4-PREGNENE - 11β,17α - DIOL - 3,20 - DIONE (OR 10β - n - PROPYL-19-NOR-HYDROCORTISONE ACETATE)

434 mg. of 3-ethylenedioxy-21-acetoxy-10β-n-propyl-19-nor-Δ5-pregnene-11β,17α-diol-20-one were dissolved in 45 cc. of a 70% acetic acid solution while agitating under nitrogen atmosphere and heated to a temperature of 75° C. over a period of 1 hour. The mixture was cooled, then very slowly poured into a cold suspension of 45 g. of sodium bicarbonate into 200 cc. of water, then it was extracted with ether. The extracts were washed with water until the wash waters were neutral, dried and evaporated to dryness under vacuum. 420 mg. of product were obtained.

The product obtained was subjected to chromatography through magnesium silicate and eluted with methylene chloride containing 5% of acetone, then with methylene chloride containing 10% of acetone. The fractions obtained were combined and evaporated to dryness under vacuum. The residue was then recrystallized from methylene chloride and from anhydrous isopropyl ether.

220 mg. of 21 - acetoxy-10β-n-propyl-19-nor-Δ4-pregnene - 11β,17α - diol - 3,20-dione were obtained having a melting point of 192° C. and a specific rotation $[\alpha]_D^{20} = +81° \pm 1$ (c.=0.5% in methanol).

The product occurred in the form of colorless, prismatic needles, insoluble in water, dilute aqueous acids and alkalis, slightly soluble in isopropyl ether, and soluble in alcohols, acetone, benzene and chloroform.

Analysis.—$C_{25}H_{36}O_6$; molecular weight=432.54. Calculated: C, 69.41%; H, 8.38%. Found: C, 69.4%; H, 8.3%.

The I.R. spectra was in accord with the proposed structure, U.V. spectra in ethanol:

Max. 247 mμ $E_{1\text{cm.}}^{1\%} = 339$

The N.M.R. spectra was in accord with the proposed structure; it showed the presence of the groups:

Methyl in the 18 position at 54 Hz.
Acetate at 123 Hz.
Hydroxyl in the 17 position at 152 Hz.
Hydrogen in the 11 position at 252 Hz.
Coupled protons at 280 and 283 Hz., significant for the grouping

Δ3-oxo-Δ4-group at 330 Hz.

This compound is not described in the literature.

STEP F.—PREPARATION OF THE 10β-n-PROPYL-19-NOR-HYDROCORTISONE BY SAPONIFICATION OF THE CORRESPONDING 21-ACETATE 1 g. of 21-acetate of 10β-n-propyl-19-nor-hydrocortisone, prepared in Step E above, was introduced into 4 cc. of ethanol, then, under a nitrogen atmosphere, 0.06 cc. of a 10% solution of sodium methylate in methanol was added. The mixture was agitated for a period of 6 hours at room temperature, then it was acidified with acetic acid and cooled. The product obtained was vacuum filtered, washed with methanol, dried and recrystallized from aqueous acetone. 10β-n-propyl-19-nor-hydrocortisone was obtained.

This product is not described in the literature.

Example IX.—Preparation of the ethyl ester of Δ⁴,¹⁷⁽²⁰⁾-pregnadiene-3,11-dione-21-oic acid 0.240 g. of sodium hydride in a 50% suspension in mineral oil were introduced in 11.5 cc. of dimethoxyethane. The mixture was agitated under a nitrogen atmosphere at a temperature of about 20° C., then 1 cc. of diethyl carbethoxymethylphosphonate was slowly added over a period of about 5 minutes. The interior temperature of the reaction mixture was maintained at about 20° C. with the aid of a water bath. The mixture was agitated at this temperature for about 1 hour, then 0.300 g. of the enolic ethyl ether of adrenosterone were added in small amounts over a period of 5 minutes. The agitation was continued for about 90 minutes under a nitrogen atmosphere, at a temperature of 20° C. Then the mixture was heated to reflux for a period of 1 hour and left under agitation for 15 hours at 20° C. 10 cc. of water were added and the aqueous mixture was extracted several times with ethyl ether. The combined extracts were washed until the wash waters were neutral and distilled to dryness under vacuum. 0.445 g. of the raw ethyl ester of the enolic ethyl ether of Δ⁴,¹⁷⁽²⁰⁾-pregnadiene-3,11-dione-21-oic acid were obtained, which may be used as such for the liberation of the ketonic function in the 3 position.

0.445 g. of the compound obtained as above, were placed in suspension under agitation in 3 cc. of ethanol. The suspension was heated under nitrogen to a temperature of 55° C., and 0.5 cc. of normal hydrochloric acid were introduced all at once. The agitation was continued at the same temperature for a period of about 5 minutes, then the mixture was cooled to 20° C. 6 cc. of distilled water were added and the mixture was iced for about 5 minutes. The crystals formed were vacuum filtered and dried. The raw ethyl ester of Δ⁴,¹⁷⁽²⁰⁾-pregnadiene-3,11-dione-21-oic acid was obtained and was purified by dissolution in isopropyl ether, filtration, concentration to a small volume and crystallization from the hot solution.

0.220 g. of the ethyl ester of Δ⁴,¹⁷⁽²⁰⁾-pregnadiene-3,11-dione-21-oic acid were obtained having a melting point of 188° C. and a specific rotation $[\alpha]_D^{20} = +120° \pm 1°$ (c.=0.54% in acetone). A second yield of 0.020 g. of product was obtained from the mother liquors. A further purification of the production may be effected by recrystallization from hot methanol.

This product was soluble in alcohol, acetone, benzene and chloroform, soluble in hot isopropyl ether, and insoluble in water.

Analysis.—$C_{23}H_{30}O_4$; molecular weight=370.47. Calculated: C, 74.56%; H, 8.16%; O, 17.26%. Found: C, 74.8%; H, 8.2%; O, 17.1%.

The I.R. spectra (chloroform) showed the absence of a ketone in the 17 position and the presence of a strong carbonyl band at 1706 cm.⁻¹.

The ethyl ester of Δ⁴,¹⁷⁽²⁰⁾-pregnadiene-3,11-dione-21-oic acid (described in United States Patent No. 2,715,621 and British Patent No. 749,195) may be transformed into hydrocortisone, following the method described in Example VIII.

Example X.—Preparation of the Δ⁴-pregnene-17α-ol-3,20-dione or 17α-hydroxy-progesterone

STEP A.—Δ⁴,¹⁷⁽²⁰⁾-PREGNADIENE-3-ONE (a) Preparation of the reagent.—4.46 g. of sodium hydride were introduced into 37 cc. of anhydrous dimethylsulfoxide, heated to about 80° C. and agitated over a period of 45 minutes. The mixture was next cooled to room temperature, then a suspension of 36.4 g. of triphenyl-ethyl-phosphonium bromide in 74 cc. of dimethylsulfoxide was added and the mixture was agitated for 15 minutes at a temperature of about 20° to 25° C.

(b) Condensation and hydrolysis.—Into the reagent, prepared as described above, 3 g. of 3-pyrrolidyl-Δ³,⁵-androstadiene-17-one, obtained according to the process described by Heyl et al. [J. of Amer. Chem. Soc. 75, page 1918 (1953)] were introduced and the mixture was heated to about 50° to 55° C. for a period of 3 hours under agitation. The mixture was then cooled to 20° C., diluted with benzene and washed with water. The organic phase was decanted, and then the organic phase was extracted with N hydrochloric acid. The acid extracts were made alkaline by the addition of N sodium hydroxide solution and extracted with methylene chloride.

The organic phase was washed with water, dried and evaporated to dryness. The residue obtained was subjected to chromatography through magnesium silicate and eluted with methylene chloride containing 0.5% acetone.

A residue was obtained which was crystallized from petroleum ether (fraction of petroleum ether boiling at 60° to 80° C.). Δ⁴,¹⁷⁽²⁰⁾-pregnadiene-3-one was obtained having a melting point of 135–136° C.

This product is colorless, insoluble in water, dilute aqueous acids and alkalis, slightly soluble in isopropyl ether and soluble in alcohol.

Analysis.—$C_{21}H_{30}O$; molecular weight=298.45. Calculated: C, 84.5%; H, 10.13%. Found: C, 84.5%; H, 10.01%.

This compound is identical with the one described in Ber. 71, 1 313 (1938).

STEP B.—Δ⁴-PREGNENE-17α-OL-3,20-DIONE (17α-HYDROXY PROGESTERONE)

50 mg. of Δ⁴,¹⁷⁽²⁰⁾-pregnadiene-3-one were dissolved in 3 cc. of t-butanol. Then, 0.1 cc. of a solution prepared from 45 mg. of osmium tetraoxide and 1.5 cc. of pyridine, were added and the mixture was agitated for 40 minutes at room temperature.

Next, very slowly and in small amounts, 52 mg. of the peroxide of triethylamine oxide were introduced, while agitating, over a period of 15 minutes. The reaction mixture was then poured into an aqueous solution containing 1% of sodium sulfite. The precipitate was vacuum filtered and washed with water until the wash waters were neutral. Then the precipitate obtained was dissolved in methylene chloride.

The solution was dried and evaporated to dryness under vacuum. The residue was recrystallized from isopropyl ether, then from methanol. Δ⁴-pregnene-17α-ol-3,20-dione (17α-hydroxy-progesterone) was obtained having a melting point of 218° C., identical to the product as obtained by other means (see for instance U.S.P. 2,648,663).

The preceding specific embodiments enable a better comprehension of the invention. It will be understood however that other expedients may be employed without departing from the spirit of invention or the scope of the appended claims.

We claim:

1. A process for the production of pregnane derivatives of the formula

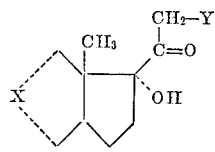

wherein Y is selected from the group consisting of hydrogen and —OR′ where R′ is selected from the group consisting of hydrogen and the acyl radical of an organic carboxylic acid having from 1 to 18 carbon atoms and X represents the A, B and C rings of a steriod molecule which comprises the steps of reacting a 17-ketone steroid of the formula

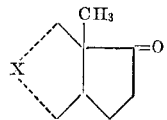

wherein X has the above-assigned meaning with a carbanion of a phosphorus compound selected from the group consisting of phosphorane ethylidenes and carb-lower-alkoxymethylphosphonates, subjecting the resultant $\Delta^{17(20)}$-pregnene of the formula

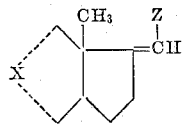

wherein X has the above-assigned meaning and Z is selected from the group consisting of —CH$_3$ and —COOR'' where R'' represents lower alkyl, to a hydroxylating oxidation and recovering said pregnane derivatives.

2. A process for the production of a $\Delta^{17(20)}$-pregnene of the formula

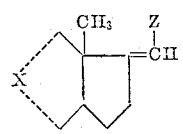

wherein Z is selected from the group consisting of —CH$_3$ and —COOR'' where R'' represents lower alkyl and X represents the A, B and C rings of a steroid molecule which comprises the steps of reacting a 17-ketone steroid of the formula

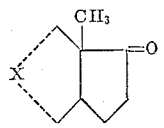

wherein X has the above-assigned meaning with a carbanion of a phosphorus compound selected from the group consisting of phosphorane ethylidenes and carb-lower-alkoxymethylphosphonates, and recovering said $\Delta^{17(20)}$-pregnene.

3. A process for the production of a 20-oxopregnane of the formula

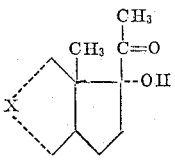

wherein X represents the A, B and C rings of a steroid molecule which comprises the steps of reacting a 17-ketone steroid of the formula

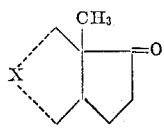

wherein X has the above-assigned meaning with a carbanion of triphenylphosphine ethylidene in an organic solvent selected from the group consisting of dioxane and dimethylsulfoxide, subjecting the resultant $\Delta^{17(20)}$-pregnane of the formula

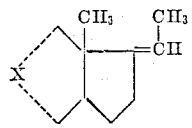

wherein X has the above-assigned meaning to the action of an osmium tetraoxide based oxidizing agent in a tertiary alcoholic media, adding a peroxide of a tertiary amine oxide and recovering said 20-oxo-pregnane.

4. A process for the production of 19-nor-9β,10α-$\Delta^4$-pregnene-17α-ol-3,20-dione which comprises the steps of reacting 3-pyrrolidyl-9β,10α-$\Delta^{3,5}$-estradiene-17-one with a carbanion of triphenylphosphine ethylidene in dimethylsulfoxide, subjecting the resultant 3-pyrrolidyl-19-nor-9β,10α-$\Delta^{3,5,17(20)}$-pregnatriene to an acid hydrolysis, reacting the resultant 19 - nor-9β,10α-$\Delta^{4,17(20)}$-pregnadiene-3-one with osmium tetraoxide in a tertiary alcoholic media, adding a peroxide of a tertiary amine oxide and recovering said 19-nor-9β,10α-$\Delta^4$-pregnene-17α-ol-3,20-dione.

5. A process for the production of a 10–11 lactone of 3-ethylenedioxy - 19-nor-$\Delta^5$-pregnene - 11β,17α-diol - 20-one-10β-carboxylic acid which comprises the steps of reacting the 10–11 lactone of 3-ethylenedioxy-19-nor-$\Delta^5$-androstene - 11β-ol-17-one - 10β-carboxylic acid with a carbanion of triphenylphosphine ethylidene in dioxane, reacting the resultant 10–11 lactone of 3-ethylenedioxy-19-nor-$\Delta^{5,17(20)}$-pregnadiene - 11β-ol-10β-carboxylic acid with osmium tetraoxide in a tertiary alcoholic media, adding a peroxide of a tertiary amine oxide, and recovering said 10–11 lactone of 3-ethylenedioxy - 19-nor-$\Delta^5$-pregnene-11β17α-diol-20-one-10β-carboxylic acid.

6. A process for the production of $\Delta^4$-pregnene-17α-ol-3,20-dione which comprises the steps of reacting 3-pyrrolidyl-$\Delta^{3,5}$-androstadiene-17-one with a carbanion of triphenylphosphine ethylidene in dimethylsulfoxide, subjecting the resultant 3-pyrrolidyl-$\Delta^{3,5,17(20)}$-pregnatriene to an acid hydrolysis, reacting the resultant $\Delta^{4,17(20)}$-pregnadiene-3-one with osmium tetraoxide in a tertiary alcoholic media, adding a peroxide of a tertiary amine oxide and recovering said $\Delta^4$-pregnene-17α-ol-3,20-dione.

7. A process for the production of a 20-oxopregnane of the formula

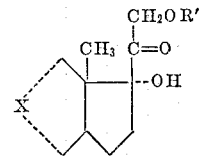

wherein R' is selected from the group consisting of hydrogen and the acyl radical of an organic carboxylic acid having from 1 to 18 carbon atoms and X represents the A, B and C rings of a steroid molecule which comprises the steps of reacting a 17-ketone steroid of the formula

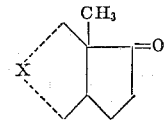

wherein X has the above-assigned meaning with a carbanion of a di-lower-alkyl carb-lower-alkoxymethylphosphonate, subjecting the resultant $\Delta^{17(20)}$-pregnene of the formula

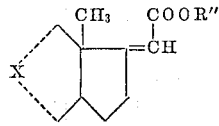

wherein X has the above-assigned meaning and R'' represents lower alkyl, to the action of a mixed metal hydride in an organic solvent, esterifying the resultant $\Delta^{17(20)}$-21-hydroxy-pregnene of the formula

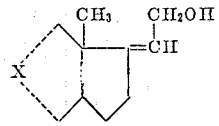

wherein X has the above -assigned meaning by the action of an esterifying derivative of an organic carboxylic acid having from 1 to 18 carbon esters, subjecting the resultant ester of the formula

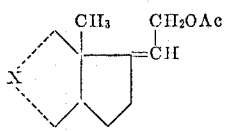

wherein X has the above-assigned meaning and Ac represents the acyl radical of an organic carboxylic acid having from 1 to 18 carbon atoms, to the action of osmium tetraoxide in a tertiary amine oxide and recovering said 20-oxo-pregnane.

8. A process for the production of 10β-n-propyl-19-nor-hydrocortisone which comprises the steps of reacting 3-ethoxy - 10β-n-propyl-$\Delta^{3,5}$-estradiene-11,17-dione with a carbanion of diethyl carbethoxymethylphosphonate in dimethoxyethane, subjecting the resultant ethyl ester of 3-ethoxy - 10β-n-propyl - 19-nor-$\Delta^{3,5,17(20)}$-pregnatriene-11-one-21-oic acid to an acid hydrolysis, reacting the resultant ethyl ester of 10β-n-propyl-19-nor-$\Delta^{4,17(20)}$-pregnadiene-3,11-dione-21-oic acid with ethylene glycol under ketalizing conditions, reducing the resultant ethyl ester of 3-ethylenedioxy - 10β-n-propyl - 19-nor-$\Delta^{5,17(20)}$-pregnadiene-11-one-21-oic acid by means of a mixed metal hydride in an organic solvent, esterifying the resultant 3-ethylenedioxy-10β-n-propyl - 19-nor-$\Delta^{5,17(20)}$-pregnadiene - 11β,21-diol with acetic acid anhydride under esterifying conditions, subjecting to the resultant 3-ethylenedioxy - 10β-n-propyl-21-acetoxy - 19-nor-$\Delta^{5,17(20)}$-pregnadiene-11β-ol to the action of osmium tetraoxide in a tertiary alcoholic media, adding a peroxide of a tertiary amine oxide, subjecting the resultant 3-ethylenedioxy - 10β-n-propyl-21-acetoxy - 19-nor-$\Delta^5$-pregnene - 11β,17α-diol-20-one to an acid hydrolysis and recovering said 10β-n-propyl - 19-nor-hydrocortisone.

9. A process for the production of 10β-n-propyl-19-nor-hydrocortisone which comprises the steps of reacting 3-pyrrolidyl - 10β-n-propyl-$\Delta^{3,5}$-estradiene - 11,17-dione with a carbanion of diethyl carbethoxymethylphosphonate in dimethoxyethane, subjecting the resultant ethyl ester of 3-pyrrolidyl - 10β-n-propyl - 19-nor-$\Delta^{3,5,17(20)}$-pregnatriene-11-one-21-oic acid to an acid hydrolysis, reacting the resultant ethyl ester of 10β-n-propyl-19-nor-$\Delta^{4,17(20)}$-pregnadiene-3,11-dione-21-oic acid with ethylene glycol under ketalizing conditions, reducing the resultant ethyl ester of 3-ethylenedioxy - 10β-n-propyl - 19-nor-$\Delta^{5,17(20)}$-pregnadiene-11-one-21-oic acid by means of a mixed metal hydride in an organic solvent, esterifying the resultant 3-ethylenedioxy - 10β-n-propyl - 19-nor-$\Delta^{5,17(20)}$-pregnadiene-11β,21-diol with acetic acid anhydride under esterifying conditions, subjecting the resultant 3-ethylenedioxy-10β-n-propyl - 21-acetoxy - 19-nor-$\Delta^{5,17(20)}$-pregnadiene-11β-ol to the action of osmium tetraoxide in a tertiary alcoholic media, adding a peroxide of a tertiary amine oxide, subjecting the resultant 3-ethylenedioxy - 10β-n-propyl - 21-acetoxy - 19-nor-$\Delta^5$-pregnene - 11β,17α-diol-20-one to an acid hydrolysis and recovering said 10β-n-propyl-19-nor hydrocortisone.

10. A process for the production of the ethyl ester of $\Delta^{4,17(20)}$-pregnadiene-3,11-dione - 21-oic acid which comprises the steps of reacting the 3-enol ethyl ether of adrenosterone with a carbanion of diethyl carbethoxymethylphosphonate in dimethoxyethane, subjecting the resultant ethyl ester of 3-ethoxy-$\Delta^{3,5,17(20)}$-pregnatriene-11-one-21-oic acid to an acid hydrolysis and recovering said ethyl ester of $\Delta^{4,17(20)}$-pregnadiene-3,11-dione-21-oic acid.

11. The 10–11 lactone of 3-ethylenedioxy - 19-nor-$\Delta^{5,17(20)}$-pregnadiene-11β-ol-10β-carboxylic acid.

12. The 10–11 lactone of 3-ethylenedioxy - 19-nor-$\Delta^5$-pregnene-11β,17α-diol-20-one-10β-carboxylic acid.

13. The 10–11 lactone of 3-ethylenedioxy-21-diiodo-19-nor-$\Delta^5$-pregnene-11β,17α-diol-20-one-10β-carboxylic acid.

14. The 10–11 lactone of 3-ethylenedioxy-21-acetoxy-19-nor-$\Delta^5$-pregnene - 11β,17α-diol-20-one - 10β-carboxylic acid.

15. The 10–11 lactone of 19-nor-$\Delta^4$-pregnene-11β,17α, 21-triol-3,20-dione-10β-carboxylic acid.

References Cited

UNITED STATES PATENTS

| | | | |
|---|---|---|---|
| 2,752,366 | 6/1956 | Hogg et al. | 260—397.1 |
| 2,781,342 | 2/1957 | Herr et al. | 260—239.5 |
| 2,793,217 | 5/1957 | Muller | 260—397.45 |
| 2,955,075 | 10/1960 | Thoma | 195—51 |
| 2,990,415 | 6/1961 | Bernstein et al. | 260—397.45 |
| 3,114,757 | 12/1963 | Jackson et al. | 260—397.1 |
| 3,198,792 | 8/1965 | Reerink et al. | 260—239.55 |

LEWIS GOTTS, *Primary Examiner.*

HENRY A. FRENCH, *Examiner.*